Aug. 9, 1960 C. R. LOCKLIN 2,948,487

TAPE-ANCHORING TAPE RECORDER REEL

Filed May 15, 1957

INVENTOR.
Charles R. Locklin
BY Barthel & Bugbee
Attys

United States Patent Office 2,948,487
Patented Aug. 9, 1960

2,948,487

TAPE-ANCHORING TAPE RECORDER REEL

Charles R. Locklin, 2140 Lochaven Road, Pontiac, Mich.

Filed May 15, 1957, Ser. No. 659,314
6 Claims. (Cl. 242—74.2)

This invention relates to sound recording devices and, in particular, to tape recorder reels.

One object of this invention is to provide a tape recorder reel having an anchoring device for firmly securing the inner end of the tape to the reel yet automatically releasing the tape at the end of the rewinding operation without damage to the tape.

Another object is to provide a tape recorder reel having an anchoring device which is of such a construction that the tape can be loaded onto the reel with the use of one hand.

Another object is to provide a tape recorder reel of the foregoing character wherein the end of the tape is anchored to the reel by a wedging action which is enhanced by the acuteness of the angle between the coacting wedging surfaces.

Another object is to provide a modified tape recorder reel of the foregoing character wherein the gripping action of the wedging device is assisted by a resilient element associated therewith.

Other objects and advantages of the invention will become apparent during the course of the following description of the accompanying drawings, wherein.

Figures 1, 2, 3, 4, 5:
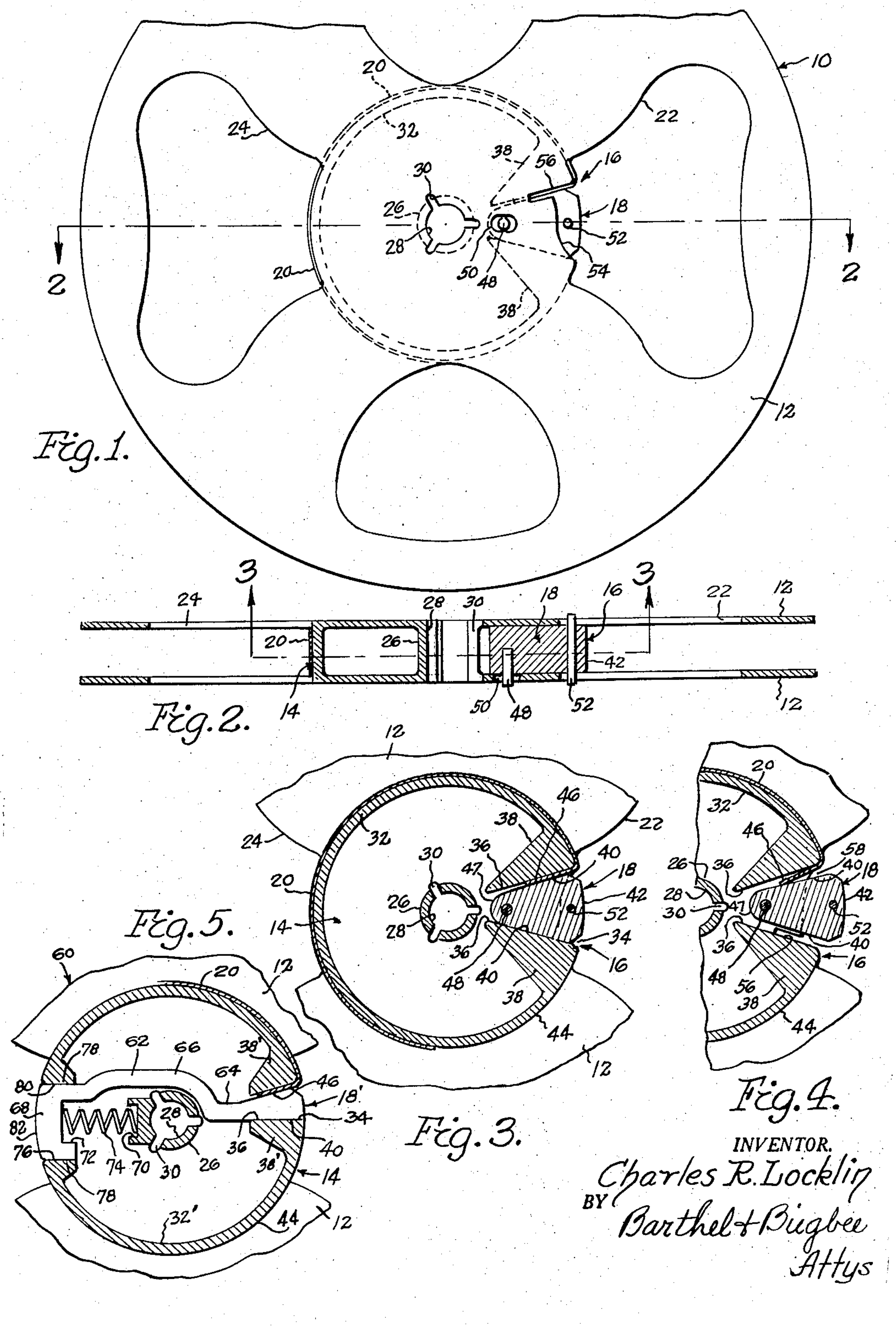
Figure 1 is a side elevation of a tape recorder reel according to one form of the invention, having a wedging device releasably securing the inner end of the tape to the hub of the reel, the upper peripheral portion of the reel being broken away to conserve space.
Figure 2 is a diametral horizontal section taken along the line 2—2 in Figure 1.
Figure 3 is a fragmentary vertical section through the reel shown in Figures 1 and 2, taken along the line 3—3 in Figure 2.
Figure 4 is a fragmentary vertical section similar to Figure 3, but showing the tape anchoring wedge in its outermost tape-releasing position.
Figure 5 is a fragmentary vertical section in a plane similar to that in Figure 3, but showing a slightly modified reel wherein the anchoring wedge is equipped with a spring-pressed arm.

Referring to the drawings in detail, Figures 1 to 4 inclusive show a tape recorder reel, generally designated 10, according to one form of the invention, as consisting generally of parallel side discs 12 preferably integral with a central hub 14 equipped with a tape anchoring wedging device 16. The reel 10, exclusive of the tape anchoring wedge 18 of the wedging device 16, is preferably molded or cast in a single piece, preferably in synthetic plastic material, and preferably of a transparent nature to enable the tape 20 to be seen through the side discs 12, in addition to their being visible through the approximately triangular cutaway portions 22 and 24 on diametrically opposite sides of the hub 14, provided for the purpose of the insertion of the user's fingers.

The hub 14 (Figures 2 and 3) is in the form of a hollow cylinder having an inner tubular portion 26 equipped with a bore 28 and slots 30 for the reception of an axle (not shown) having corresponding radial pins adapted to engage the slots 30. The hub 14 also has an outer or winding drum portion 32 of hollow cylindrical form with an interrupted periphery providing a gap 34 of wedge-shaped form with surfaces 36 inclined at a very acute angle relatively to one another to impart an enhanced gripping effect to the correspondingly-shaped approximately triangular wedge 18. The surfaces 36 are formed in approximately radial bosses 38 of roughly triangular section with their apices directed inwardly toward the tubular portion 26.

The wedge 18, as its name indicates, has opposite wedging surfaces 40 (Figure 3) which are inclined toward one another at substantially the same acute angle as the acute angle between the wedging surfaces 40 of the hub 14. The outer end 42 of the wedge 18 is arcuate or is a section of a cylinder of substantially the same curvature as the outer cylindrical surface 44 of the drum portion 32 so as to form, in effect, a continuation thereof when the wedge 18 is in its wedging position holding the tape end 46 wedged between two of the wedging surfaces 40 and 36. The wedge 18 near its rounded forward or inner end 47 is drilled transversely to receive a transversely-projecting guide pin 48, the outer end of which projects through an elongated radial guide slot 50 (Figures 1 and 2). The wedge 18 near its outer end 42 is also drilled transversely to receive a handle pin 52, the outer ends of which project beyond the side surfaces of the side discs 12 so as to be capable of being grasped between the fingers or fingernails of the user, these ends projecting into the inner end portions 54 of the cutaway portions or openings 22. The cutaway portions or openings 22 are also provided with radial slots 56 (Figure 1) extending toward the central tubular portion 26 in line with the surfaces 36 and 40 on one side of the wedge 18 so as to facilitate insertion of the tape end 46.

In the use of the tape reel 10 to anchor the inner end 46 of the tape 20 to the hub 14, the user grasps the side discs 12 of the reel 10 in the palm and between the fingers of one hand, using his thumb and forefinger of the same hand to grasp the opposite ends of the pin 52 therebetween, pulling outward thereon to retract the wedge 18 of the wedging device 16 outwardly into the retracted position of Figure 4. The user then inserts the end 46 of the tape 20 into the space 58 between the wedge surface 40 and the hub surface 36, and then pushes inward upon the outer surface 42 or pin 52 to jam the tape end 46 firmly into the gap 34 (Figure 3), closing up the space 58 between the wedging surfaces 36 and 40 so as to grip the tape end 46 tightly between them. The acuteness of the angle between the wedging surfaces 36 and also between the wedging surfaces 40 enhances the self-retention of the wedge 18 in the gap 34. He then winds one or two turns of the tap 20 upon the drum portion 32 of the hub 14, after which the reel 10 is ready to be placed upon a winding spindle or axle and wound with the remainder of the tape 20 as it is being recorded or reproduced, as the case may be.

When the reel 10 has been fully wound with tape, and the tape 20 is to be rewound on another reel, rewinding is accomplished in the usual manner. The tape 20 is automatically payed off the drum portion 32 as the reel 10 revolves, in response to the tangential pull of the tape 20 upon the hub 14. When the last turn of the tape 20 is unwound and the end portion 46 is reached, the outward approximately radial jerk thereon instantly dislodges the wedge 18 and pulls it outward toward the open or loading position shown in Figure 4, whereupon the tape end 46 is released without damage or tearing and is wound upon the other winding reel.

The modified tape recording reel, generally designated 60, shown in Figure 5 is similar in most respects to the form of the invention shown in Figures 1 to 4 inclusive, and similar parts and surfaces are designated with the same reference numerals. In Figure 5, however, the wedge 18' does not terminate at its inner end as in the case of the reel 10, but has a generally diametral extension arm 62 integral with its inner end. The arm 62 consists of a radial portion 64 secured to the inner end of the wedge 18', a generally arcuate laterally-offset portion 66 curved to pass around the inner tubular portion 26, and a hollow button portion 68 formed on the opposite end of the arm 62 from its connection with the wedge 18'. The inner tubular poriton 26 and button portion 68 have radially-directed spring abutment sockets 70 and 72 respectively facing one another and receiving the opposite ends of a helical compression spring 74. The latter urges the button 68 outwardly through a radial gap 76 in the outer or winding drum portion 32' having parallel side walls 78 so as to reciprocably receive the parallel opposite side walls 80 of the button 68. The latter has an outer arcuate surface 82 which in effect forms a continuation of the outer interrupted cylindrical surface 44 of the drum portion 32' of the hub 14.

The use of the modified tape recorder reel 60 is generally similar to that described above for the tape recorder reel 10, except that instead of grasping the outer ends of the pin 52, the user pushes radially inward upon the button 68 in order to force the wedge 18' radially outward on the opposite side of the tubular central portion 26 to open up a gap between the wedge 18' and the triangular bosses 38'. While holding the wedge 18' in its retracted position against the thrust of the coil spring 74 in this manner, the user inserts the tape end 46 in the gap between the wedge 18' and adjacent boss 38', whereupon he releases the button 68. The radial thrust of the spring 74 outward from the spring socket 70 against the button 68 pulls the diametrically opposite wedge 48 radially inward through the connection provided therebetween by the arm 62, wedging the tape end 46 firmly between the wedge 18' and triangular boss 38'.

The spring 74 is chosen to be of such force as to hold the wedge 18' firmly in the gap 34 between the wedge 18' and the triangular bosses 38', yet to be sufficiently weak to release the tape end 46 instantly without damage when the rewinding has been completed and exerts a radial pull on the tape end 46.

What I claim is:

1. A tape-anchoring tape recorder reel comprising a hub member having side disc members thereon forming an annular tape-receiving space, said hub member having an outer substantially cylindrical tape-receiving portion with an approximately radially-directed wedge-shaped recess therein and an inner central portion coaxial with said outer portion and having therein a bore adapted to receive a reel-supporting axle and a tape-anchoring wedge radially reciprocably mounted in said recess, said recess and said wedge having coacting wedging surfaces converging toward the axis of rotation of said hub, one of said members having a wedge-reciprocation guideway therein, and said wedge having a wedge-guiding portion projecting therefrom into sliding engagement with said guideway.

2. A tape-anchoring tape recorder reel, according to claim 1, wherein at least one of said side disc members has a cutaway portion therein adjacent said hub member and wherein said wedge is provided with a laterally-projecting handle extending into said cutaway portion.

3. A tape-anchoring tape recorder reel, according to claim 1, wherein said outer substantially cylindrical tape-receiving portion includes a hollow drum spaced radially away from said inner central portion and wherein said wedge has an inner end also spaced radially away from said inner central portion.

4. A tape-anchoring tape recorder reel, according to claim 1, wherein said wedge has a generally diametral arm connected thereto and extending approximately diametrically across said hub to the opposite side thereof from said wedge.

5. A tape-anchoring tape recorder reel, according to claim 4, wherein a resilient element is disposed between said arm and one of said members, said element being arranged to urge said wedge into wedging engagement with said recess.

6. A tape-anchoring tape recorder reel, according to claim 5, wherein said hub member is hollow and wherein said resilient element is disposed within the hollow hub member.

References Cited in the file of this patent

UNITED STATES PATENTS

| | | |
|---|---|---|
| 2,373,704 | Obolensky | Apr. 17, 1945 |
| 2,481,665 | Henne | Sept. 13, 1949 |
| 2,734,692 | Robinson | Feb. 14, 1956 |
| 2,766,948 | Mundt et al. | Oct. 16, 1956 |